(12) United States Patent
Locatelli et al.

(10) Patent No.: US 7,564,414 B2
(45) Date of Patent: *Jul. 21, 2009

(54) PASSIVE DEVICE FOR INCREASING THE TRANSMISSION EFFICIENCY OF RADIO-FREQUENCY SYSTEMS

(75) Inventors: Marcel Locatelli, Montbonnot (FR); Thierry Thomas, Varces (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/726,630

(22) Filed: Mar. 21, 2007

(65) Prior Publication Data

US 2007/0182650 A1 Aug. 9, 2007

Related U.S. Application Data

(63) Continuation of application No. 10/495,068, filed on May 4, 2004, now Pat. No. 7,262,743.

(51) Int. Cl.
*H01Q 1/32* (2006.01)
*H04B 1/18* (2006.01)
*H04B 5/00* (2006.01)

(52) U.S. Cl. .......................... 343/711; 343/720; 343/853; 455/41.1

(58) Field of Classification Search ................. 343/742, 343/744, 841, 842, 846, 853, 867, 872, 711, 343/720; 455/575.7, 41.1, 41.2; 73/146.5; 340/443, 10.1, 426.33, 447, 448, 572.5, 572.7
See application file for complete search history.

(56) References Cited

U.S. PATENT DOCUMENTS

| 3,657,652 A | 4/1972 | Smith .......................... 343/709 |
| 4,642,786 A | 2/1987 | Hansen ....................... 702/153 |
| 5,181,043 A | 1/1993 | Cooper ....................... 343/713 |

FOREIGN PATENT DOCUMENTS

| DE | 197 00 110 | 7/1998 |
| GB | 2 288 103 | 10/1995 |
| WO | WO 00/26989 | 5/2000 |

*Primary Examiner*—Michael C Wimer
(74) *Attorney, Agent, or Firm*—Sughrue Mion, PLLC

(57) ABSTRACT

Radio-frequency transmission device comprising a transmission antenna (2) and a receiving antenna (4), characterized by comprising one or more passive resonant circuits (5) positioned between the transmission and receiving antennas (2, 4).

3 Claims, 4 Drawing Sheets

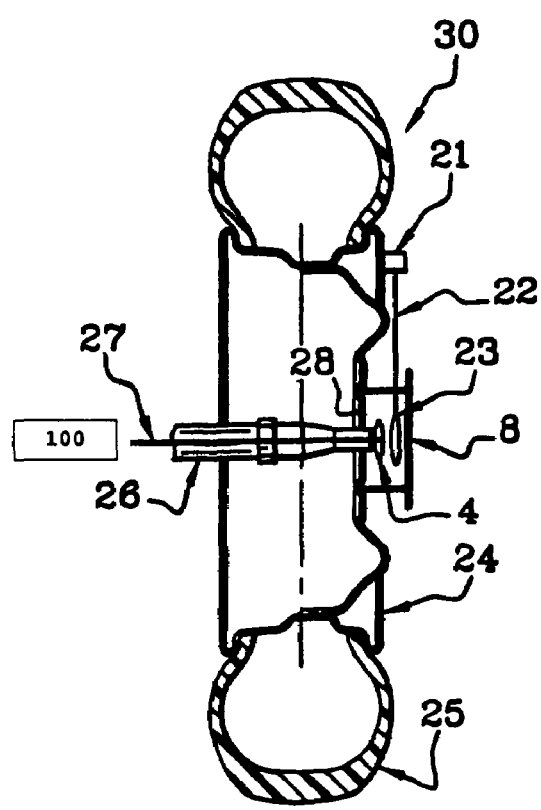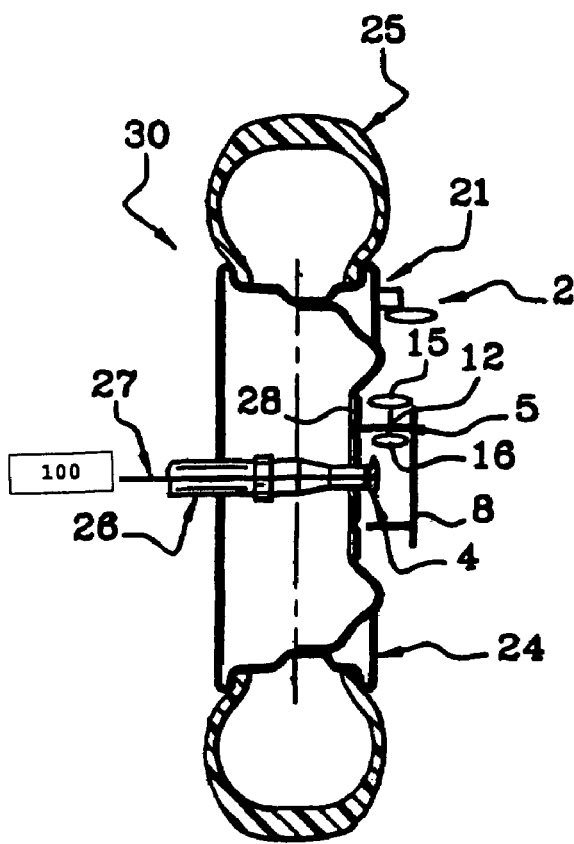
FIG. 3A Prior Art
FIG. 3B

PASSIVE DEVICE FOR INCREASING THE TRANSMISSION EFFICIENCY OF RADIO-FREQUENCY SYSTEMS

CROSS-REFERENCE TO RELATED APPLICATION

This application is a continuation and claims priority of U.S. patent application Ser. No. 10/495,068, entitled "PASSIVE DEVICE FOR INCREASING THE TRANSMISSION EFFICIENCY OF RADIO-FREQUENCY SYSTEMS" by Marcel Locatelli, filed on May 4, 2004 now U.S. Pat. No. 7,267,743.

TECHNICAL FIELD

The invention concerns the field of radio-frequency devices featuring a transmission antenna and a receiving antenna.

It concerns in particular but not restrictively such devices for which the distance between the transmission antenna and the receiving antenna is short, compared to the wavelength $\lambda$ of a carrier wave circulating between the transmission antenna and the receiving antenna, this distance being less than or of the same order of magnitude as $\lambda/2\Pi$.

PRIOR ART

It is known that a transmission antenna and a receiving antenna can be used operating in a close or distant field. Operating with a close field corresponds to the case indicated above, in which the distance between the antennas is less than or of the same order of magnitude as $\lambda/2\Pi$. It uses the model that is virtually stationary. On the contrary, the distant field for which the distance between the transmission antenna and the receiving antenna is significantly greater than $\lambda/2\Pi$ uses propagation operation.

The amplitude of the electromagnetic induction decreases in the case of close field operation, according to a law of $1/d^n$ and of $1/d$ in the case of distant field operation. d designates the distance between the transmission and receiving antennas and the exponent n is a number between 1 and 3 that depends on the directivity of the antennas and the distance between the antennas.

In the case of close field operation, used for the transmission of information as well as for the transmission of energy, it follows that the efficiency of the transmission decreases very rapidly with distance. One known solution is to increase the power emitted in order to have an energy or signal level that can be used at the receiving antenna.

The possibilities in this option of increasing the power emitted are however limited due to the applicable standards, in particular on platforms such as aircraft where there are a large number of items of electronic equipment that is sensitive to jamming due to white noise.

BRIEF DESCRIPTION OF THE INVENTION

According to the invention, it is planned to increase the efficiency of the transmission without increasing too much the power emitted, to have one or more resonant circuits on the direct path or on the walls between the receiving antenna and the transmission antenna.

In this way, the invention concerns a radio-frequency transmission device comprising a receiving antenna and a transmission antenna characterised in that it comprises one or more passive resonant circuit(s) positioned between the receiving and transmission antennas.

Preferably, the passive resonant circuit is tuned to a frequency equal or close to a frequency circulating between the receiving and transmission antennas.

When we say that the passive resonant circuit is positioned between the receiving and transmission antennas, it is meant that it is situated in a volume defined by two planes parallel to one another, one passing through the transmission antenna, and the other through the receiving antenna and perpendicular to the direction joining the two receiving and transmission antennas. Preferably, and if there is nothing disturbing the passive resonant circuit, the latter will be positioned on the direct path between the receiving and transmission antennas. If there are walls positioned between the receiving and transmission antennas, in particular walls that are electrically conductive, forming an obstruction to the propagation of the electromagnetic waves, the passive resonant circuit will be positioned so that part of it is located on one side of the wall and part of it on the other side of the wall. If the wall is small in size defining a finite dimensioned volume positioned between the receiving and transmission antennas, the passive resonant circuit may be positioned so that one part of it is situated towards the transmission antenna and another part facing towards the receiving antenna. Of course, it is possible to position several passive resonant circuits between the receiving and transmission antennas, in particular at each electrically conductive wall located between the receiving and transmission antennas.

BRIEF DESCRIPTION OF THE DRAWINGS

The invention, and examples of embodiments and application of the invention will now be described with reference to the appended drawings in which:

FIG. 3 comprises a part A and a part B. Part A represents a transmission of information between a sensor and distant processing means produced according to the prior art, part B diagrammatically represents an improvement of the transmission using the invention for the same transmission;

In the figures, identical reference numbers are attributed to elements that have the same function.

DESCRIPTION OF EXAMPLES OF EMBODIMENTS AND USES

Figure 1:
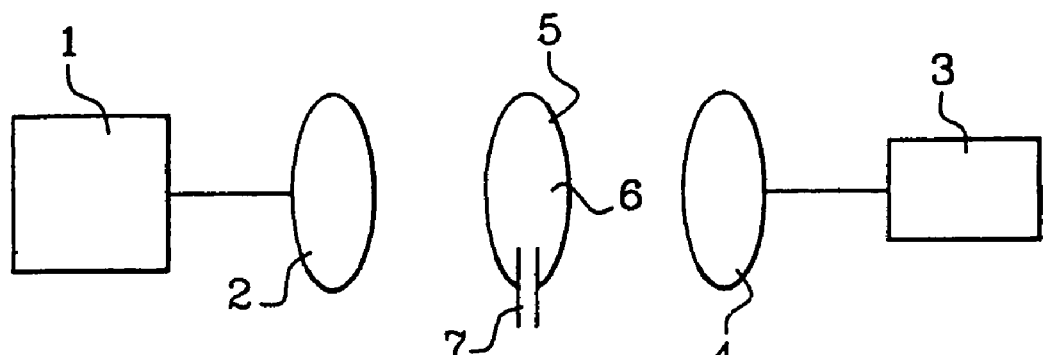
FIG. 1 is a diagrammatical illustration of the device according to the invention.

FIG. 1 diagrammatically represents a device according to the invention. The device comprises transmission 1 and receiving 3 circuits, which are known, respectively coupled in a known manner to a transmission antenna 2 and to a receiving antenna 4. According to the invention, a passive resonant circuit 5 is positioned between the transmission 2 and receiving 4 antennas. Such passive resonant circuits 5 as well as the processes used to manufacture them are also known. Such circuits are used for example to signal objects to which they are attached when these objects pass through gates, for example in shops comprising radiofrequency transmission means whose transmission frequency is equal to the resonance frequency of the passive resonant circuit. In FIG. 1, the passive resonant circuit 5 is represented by an inductive coil; 6 coupled to a capacitor 7. As explained in detail in appendix to this application, the presence of such a passive resonant circuit 5 improves the coupling between the transmission 2 and receiving 4 antennas.

Figure 2:
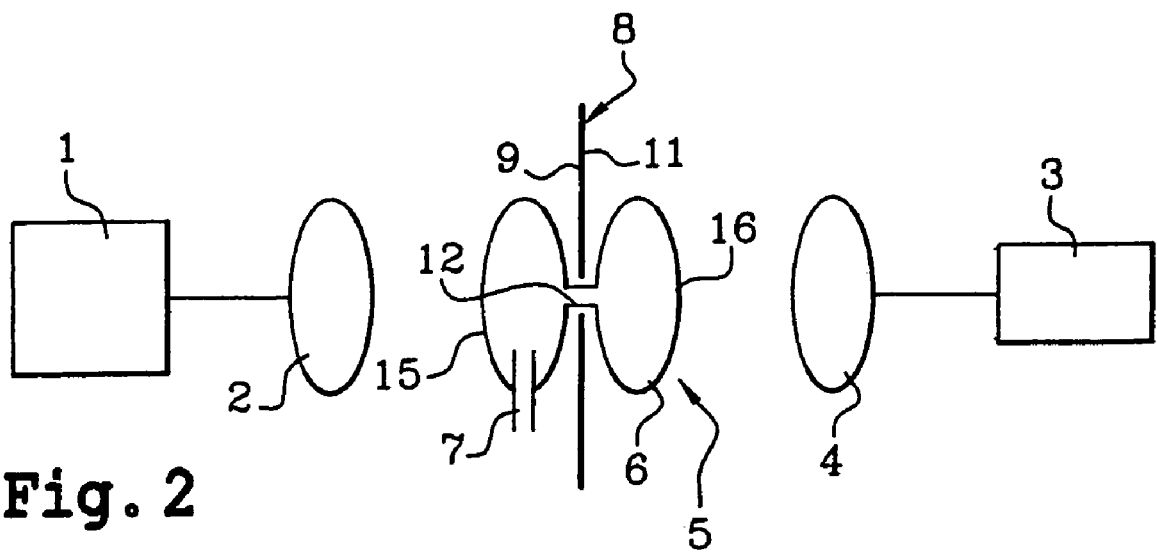
FIG. 2 is a diagrammatical illustration of the device according to the invention in the case of a wall being positioned in the path between the transmission and receiving antennas.

One particularly interesting embodiment of the invention will now be described with reference to FIG. 2. This embodiment concerns the case where a conductive wall, 8, is positioned between the transmission 2 and receiving 4 antennas. This wall 8 acts as a screen to the transmission between the transmission and receiving antennas. According to this embodiment of the invention, the passive resonant circuit 5 is positioned on the wall 8 so that one part 15 of the passive resonant circuit 5 is located on a first face 9 of the wall 8, or on the same side as this face 9, and a second part 16 of the passive resonant circuit 5 is located on a second face 11 of the wall 8, or on the same side as this face 11, the first and second parts of the passive resonant circuit 5 being electrically connected to one another by means of a conductor 12 which traverses the wall 8.

The coupling obtained by such a connection through a conductive wall 8 on which is mounted such a passive resonant circuit 5 is illustrated in a second part of the appendix to the first description.

Therefore, according to this embodiment, the passive resonant circuit is physically split into a first 15 and a second 16 part, connected to one another by electrical conductors 12 passing through a wall 8 with two faces, 9 and 11, a first face 9 and a second face 11, the first part 15 of the passive resonant circuit 5 being located on the same side as the first face 9 and the second part 16 of the passive resonant circuit 5 being located on the same side as the second face 11.

One interesting application of this embodiment will now be described with reference to FIG. 3, which comprises parts A and B. Part A represents an embodiment of the prior art. A sensor 21 of an order of magnitude of operation of a device 25, transmits data to processing means 100. The sensor 21 and the processing means 100 are separated in particular by a conductive wall 8. In the case shown with reference to FIG. 3, part A and part B, the sensor is a pressure sensor 21 for a tyre 25. The tyre 25 is fitted onto a removable rim 24 of a wheel 30 with a hub 28. The hub 28 of the wheel 30 rotates around a spindle or a fixed stub axle 26. The connection between the sensor 21 and the processing means 100 passes via a first wire connection 22 that traverses a rotating cover 8 which protects the hub 28. The sensor 21, the removable rim 24, the hub 28, the wire connection 22 and the rotating cover 8 rotate with the wheel 30 so that their relative positions remain unchanged during rotation. Inside of the rotating cover 8, an electromagnetic coupling between a second wire connection 27 that does not rotate, located inside the spindle or stub axle 26, is provided by a rotating antenna 23 connected to the first wire connection 22 and a fixed antenna 4 connected to the second wire connection 27.

The wire connection 22 between the sensor and the rotating antenna is fragile and there is a resulting fragility of the transmission between the sensor 21 and the processing means 100. Furthermore, when dismantling for maintenance operations or to change a tyre, precautions must be taken in order to avoid making the connection fragile and to check that the connection is still made after reassembly. In short, such a connection is not very reliable and complicates maintenance work. The use of a passive resonant circuit 5 as described with reference to FIG. 2 permits a sure connection to be made. Fitting and removing the rim are simplified as the hub is independent of the rim, as no wire connection is required between the sensor and the hub.

The assembly using the invention is shown in part B of FIG. 3. A transmission antenna 2 receiving the data to be transmitted is coupled to the sensor 21. A passive resonant circuit 5 is positioned on the wall 8 forming the protective cover. The passive resonant circuit is split into two parts, 15 and 16. A first part 15 of the passive resonant circuit 5 is located on the outside of the cover 8 and a second part 16 of the passive resonant circuit 5 is located inside the cover 8. The first 15 and second 16 parts of the passive resonant circuit 5 are electrically connected to one another by an insulated conductor 12 which traverses the cover 8. In the case covered above, the wheel may be the wheel of an aircraft undercarriage or more generally a platform on wheels but the use of the invention is advantageous each time that the transmission and receiving antennas rotate with respect to one another.

Thus in general, the invention concerns the use of a radiofrequency transmission device to make a radiofrequency transmission through a wall between a transmission antenna and a receiving antenna which rotate with respect to one another, in which a passive resonant circuit 5 is physically divided into a first 15 and a second 16 part connected to one another by insulated electrical conductors 12 which traverse the electrically conductive wall 8, which has two faces 9 and 11, a first 9 and a second 11, the first 15 part of the passive resonant circuit 5 being located on the same side as the first face 9, and the second part 16 of the passive resonant circuit 5 being located on the same side as the second face 11.

Figure 4:
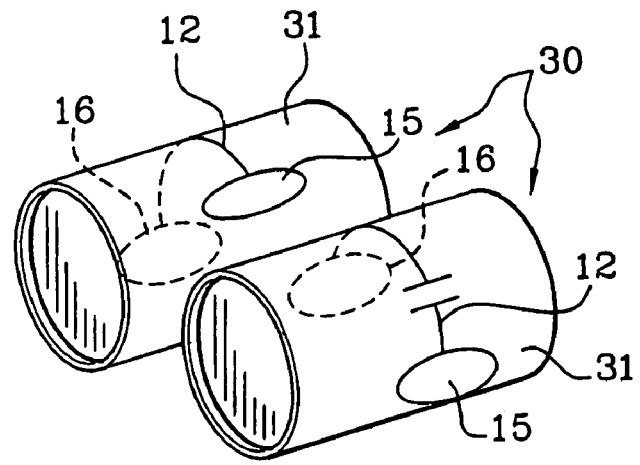
FIG. 4 represents another use of the invention, for a transmission between the receiving and transmission antennas, between which are positioned small sized conductive surfaces that do not enclose either of the antennas.

A second advantageous use of the invention concerns the case where the connection between the transmission and receiving antennas is obstructed not by a large wall 8 positioned between the antennas or enclosing possibly with other walls the transmission antenna or the receiving antenna, as described in the cases above, but by one or more small conductive surfaces or by curved or angular surfaces. For example, this could be walls forming part of a dihedron. Another example of such a case is given for example by a transmission between a transmission antenna and a receiving antenna separated from one another by metal cans. These cans form an obstacle to the transmission. Of course, it can be envisaged to equip these cans with two resonant circuits, the first positioned to traverse the first wall and the second to traverse the second wall, for example diametrically opposed to the first. However, one embodiment of the passive resonant circuit located between the two antennas permits just a single circuit to be used for a curved surface. This embodiment will now be described with reference to FIG. 4. This figure shows two cans 30 through which we know that a radiofrequency transmission has to be passed between two antennas that are not shown. The internal volumes of these cans are defined by the walls 31 formed by the junction of a cylindrical wall and two flat flanges positioned perpendicularly to the cylindrical wall. The wall thus formed defines a closed volume. In general, the wall defines at least partially a volume. In order to make the transmission possible, a resonant circuit 5 is present on each of the walls 31. The passive resonant circuits are designed in two parts, a first 15 and a second 16 part. The two parts are connected to one another by a conductive connection 12. The conductive connection 12 does not traverse the wall. In the case described here, where the walls 31 partially define the volumes or closed volumes, the connection 12 and the two parts 15, 16, of the passive resonant circuit 5 are entirely outside of the defined volume. The first and second parts will be preferably positioned with respect to one another on parts of the wall 31 that are more or less opposite one another. By opposite to one another, we mean for example for a cylindrical surface parts that are diametrically opposed to one another, but not necessarily at the same level with respect to a base. The flat flanges of the cans 30 also form opposed parts. Generally speaking, two points on a closed wall will be considered to be opposed if they can be joined by a straight line which passes through the centre of a volume defined by the wall. When the wall is not closed, two points on the wall will be considered to be opposed if they can be joined by a straight line passing inside the volume partially defined by the wall. In such a case, the outside face of the wall will be the face which does not contain the straight segment joining the two points of the wall. Thus for example, in the case of a continuous wall defined by two parts of secant planes, a straight secant to the two parts of the planes in one point of each plane contains a straight segment defined by the two points of intersection. This segment is entirely inside a volume partially defined by the same face of the wall. This is called the inside face. The other is called the outside face.

In summary, in this embodiment, the transmission and receiving antennas are separated by one or more conductive walls which have an inside and an outside face, at least partially defining a volume. One or more passive resonant circuits are physically divided into a first and a second part connected to one another by electrical conductors, the first and second parts and the electrical conductor connecting them, of each passive resonant circuit in two parts, are entirely located on the outside face of one or more of the said walls positioned between the transmission and the receiving antennas. The first and second parts are on opposed zones of the said outside faces of the said walls.

Figure 5:
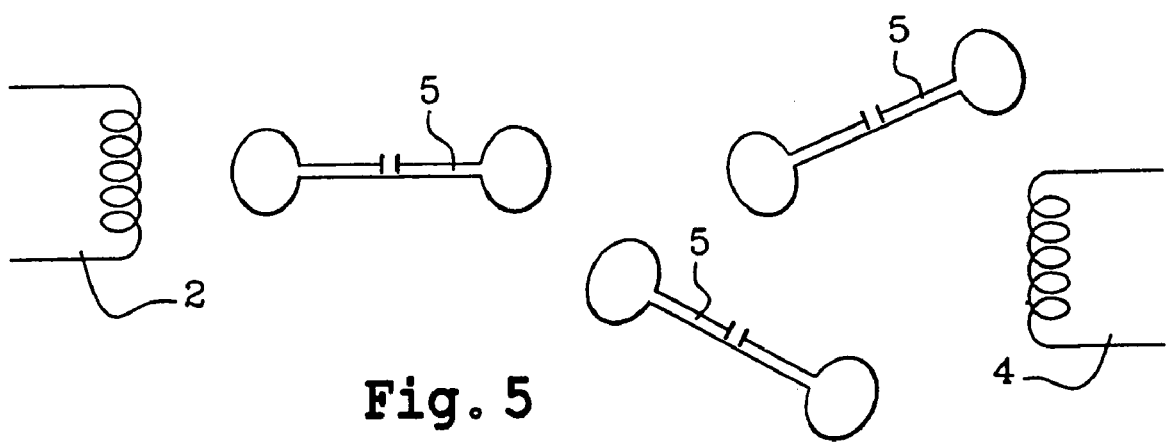
FIG. 5 schematically represents the effect of the use mentioned in conjunction with FIG. 4.

The result is symbolised by FIG. 5. Due to the opposed position of the two parts of the passive resonant circuit 5, and regardless of the position of the walls, there is virtually always coupling between the transmission 2 and receiving 4 antennas.

APPENDIX

Concept of Resonant Circuit Coupling

Figure 6:
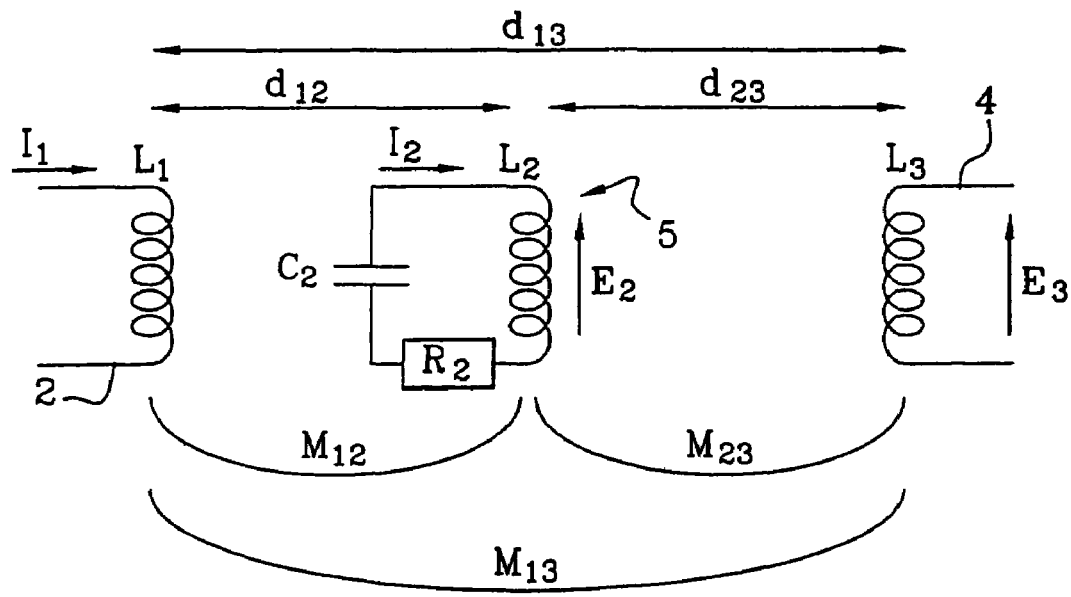
FIGS. 6 and 7 are designed to illustrate the factors which intervene when calculating the coupling between the transmission and receiving antennas in the case of a direct path and in the case of a wall being traversed respectively.
Figure 7:
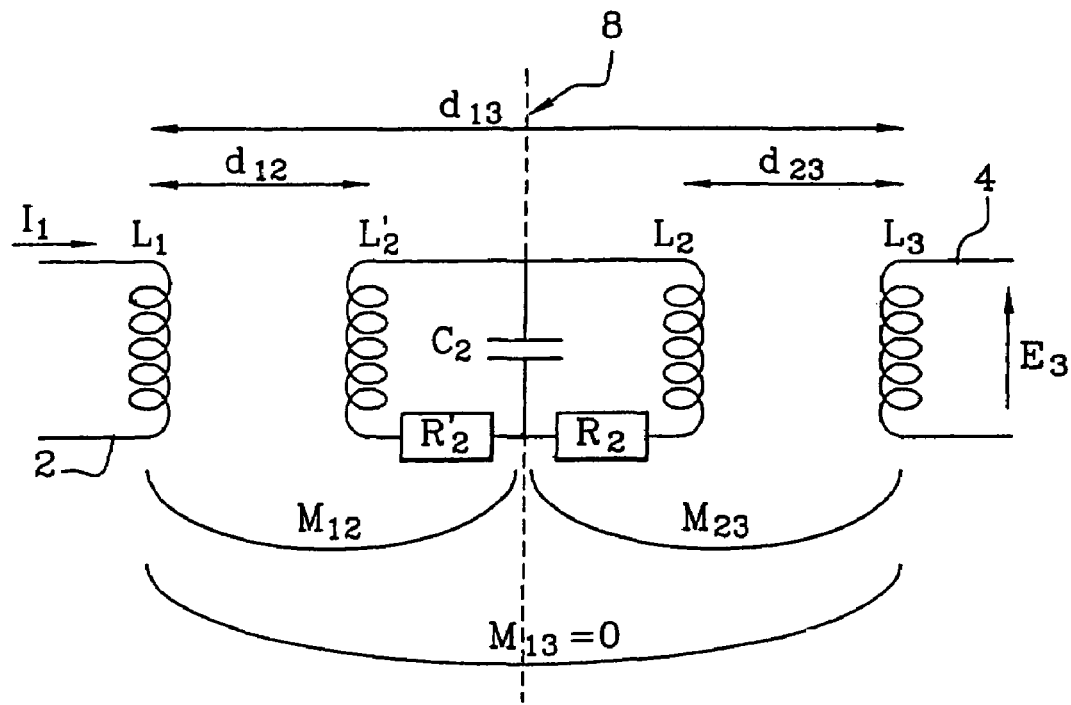

Take the basic circuit represented in FIGS. 6 and 7. These circuits have a transmission antenna 2 magnetically coupled to a receiving antenna 4. These antennas are schematically represented in the form on induction coils $L_1$ and $L_3$ respectively. A resonant circuit 5 in the form of a series circuit formed by an inductance $L_2$, a resistor $R_2$ and a capacitor $C_2$ is situated between the two antennas. In FIG. 7, this circuit 5 is in two parts located on either side of a wall 8, traversed for example imperviously by the circuit 5. The inductance of the circuit 5 is the sum of the two inductances $L_2$ and $L_2'$ positioned on either side of the wall 8. In the following example, a distance between two antennas, for example the inductances $L_1$ and $L_3$, is indicated by $d_{13}$ or more generally between an inductance I and an inductance j by $d_{ij}$. The same is true for a coupling k or a mutual coupling between an inductance I and an inductance j.

With the hypothesis that the coupling $k_{ij}$ between an antenna i and an antenna j depends on the distance $d_{ij}$ between the antennas i and j according to the relationship:

$$k_{ij}=a/d_{ij}^n \quad (1)$$

where a is a constant and where n is a number between 1 and 3.

With the coupling mutual Mij between the inductance $L_i$ and $L_j$ of the antennas i and j:

$$M_{ij}=k_{ij}(L_iL_j)^{1/2} \quad (2)$$

In the case of the intermediate resonant circuit 5, $L_2C_2\omega^2=1$, where $\omega=2\Pi f$, where f is the frequency of the signal emitted by the antenna 2 $L_2$, the voltage surge factor $Q=L_2\omega/R_2$; the addition of this circuit is translated by a gain G in the induced electromotive force $E_3$ at the receiving antenna $L_3$.

$$G=1-jQ(k_{12}k_{23}/k_{13})$$

where $j=(-1)^{1/2}$

With the simplifying hypothesis $d_{12}=d_{23}=d_{13}/2=d/2$ expressing that the circuit 5 is located halfway between the antennas, and the modulus of G>>1

$$G=k_{13}Q4^n$$

Numerical example
$k_{13}=0.05$
$Q=15$
$N=2$
$G=12$

Version with Passage through Metallic Wall 8, Represented on FIG. 7

In this case, the direct coupling is nil: $k_{13}=0$. The relay circuit is formed by two inductances coupled with a capacitor $C_2$.

The resonance condition is expressed by the relationship:

$$C_2\omega^2(L_2'L_2/(L_2'+L_2))=1,$$

With the simplifying hypothesis in which the inductances $L_2$ and $L_2'$ are identical: $L_2=L_2'$ and $R_2=R_2'$ The voltage surge factor:

$$Q=L_2\omega/R_2=2/R_2C_2\omega$$

With the same hypotheses as we have already seen concerning the distances, the efficiency E (in this case, we do not speak of gain as the direct coupling is nil) corresponds to the ratio between the coupling through the wall via the resonant circuit and a reference system of direct coupling without a wall of factor $k_{13}$.

$$E=2/Q(k_{13}K_{23}/k1_2)$$

The efficiency is half of the gain for the system without walls with a resonant coupling circuit. With the hypothesis that the coupling between the antennas depends on the distance according to the relationship:

$$K_{ij}=a/d_{ij}^n$$

Where n is a number between 1 and 3.
The coupling mutual:

$$M_{ij}=k_{ij}(L_iL_j)^{1/2}$$

With the simplifying hypothesis:

$$D_{12}=d_{23}=d_{13}/2=d/2$$

$$E=k_{12}4^n Q/2$$

Numerical example:
$K_{13}=0.05$
$Q=15$
$N=2$

The invention claimed is:
1. A transmission device for performing an electromagnetic transmission between a sensor located on a rim of a wheel, the sensor rotating with said wheel, and processing means not rotating with said wheel, said transmission device comprising:

- a first antenna connected to said sensor and extending next to said sensor;
- a second antenna connected to said processing means and extending next to an extremity of a spindle supporting said wheel;
- a wheel cover attached to said wheel for covering said extremity of said axle, so that said first antenna extends outside said cover and said second antenna extends inside said cover; and
- at least one passive resonant circuit fixed on said cover, each passive resonant circuit including a first radiator element extending outside said cover so as to be in electromagnetic relation with said first antenna, a second radiator element extending inside said cover so as to be in electromagnetic relation with said second antenna, and a conductor that traverses said cover for electrically connecting said first radiator element and said second radiator element.

2. The transmission device of claim 1, wherein said at least one passive resonant circuit further includes at least one capacitive element for tuning a resonant frequency thereof to substantially match a frequency of operation of said antennas.

3. The transmission device of claim 1, wherein said cover is made of conductive material, said conductor being insulated from said cover.

\* \* \* \* \*